United States Patent [19]
Schowe

[11] Patent Number: 5,446,353
[45] Date of Patent: Aug. 29, 1995

[54] DIGITAL MOTOR COMMUNICATION CIRCUIT AND METHOD

[75] Inventor: Lester F. Schowe, Louisville, Colo.

[73] Assignee: Maxtor Corporation, San Jose, Calif.

[21] Appl. No.: 116,792

[22] Filed: Sep. 7, 1993

[51] Int. Cl.6 .............................................. H02P 6/02
[52] U.S. Cl. .................................... 318/254; 318/439
[58] Field of Search ...................... 318/254, 138, 439

[56] References Cited

U.S. PATENT DOCUMENTS

| 5,172,036 | 12/1992 | Cameron | 318/138 |
| 5,317,243 | 5/1994 | Cameron | 318/254 |
| 5,319,289 | 6/1994 | Austin et al. | 318/254 |

Primary Examiner—William M. Shoop, Jr.
Assistant Examiner—Brian Sircus

[57] ABSTRACT

A method and circuit for generating a commutate signal required to control the spindle motor. The spindle motor generates a BEMF signal which transitions periodically between states. This signal is used to generate a synchronizing pulse at the transitions of the BEMF signal. The synchronizing pulse resets a counter which incrementally counts a value at each clock pulse of the circuit. When a BEMF transition is received, a maximum count value for the BEMF period is determined and the counter is reset to zero. The maximum count value is then divided in half, preferably by a right shifting binary representation of the maximum count value by one bit, thereby dividing the value by one-half, and is input to a register. The value equal to one-half of the maximum count value is then outputted from the register at each subsequent clock pulse to a comparator. Also output is the current count generated by the counter. Thus when the curent counter value equals the value stored in the register, a pulse is generated. This pulse, referred to as the A=B pulse, is then used to generate the commutate signal. The present invention therefore ensures that the commutate signal is always generated halfway between transitions of the BEMF signal regardless of minor variations in the location of the BEMF signals, or timing of the BEMF signals due to varying speeds of spindle rotation, thereby insuring the proper control of the spindle motor.

21 Claims, 4 Drawing Sheets

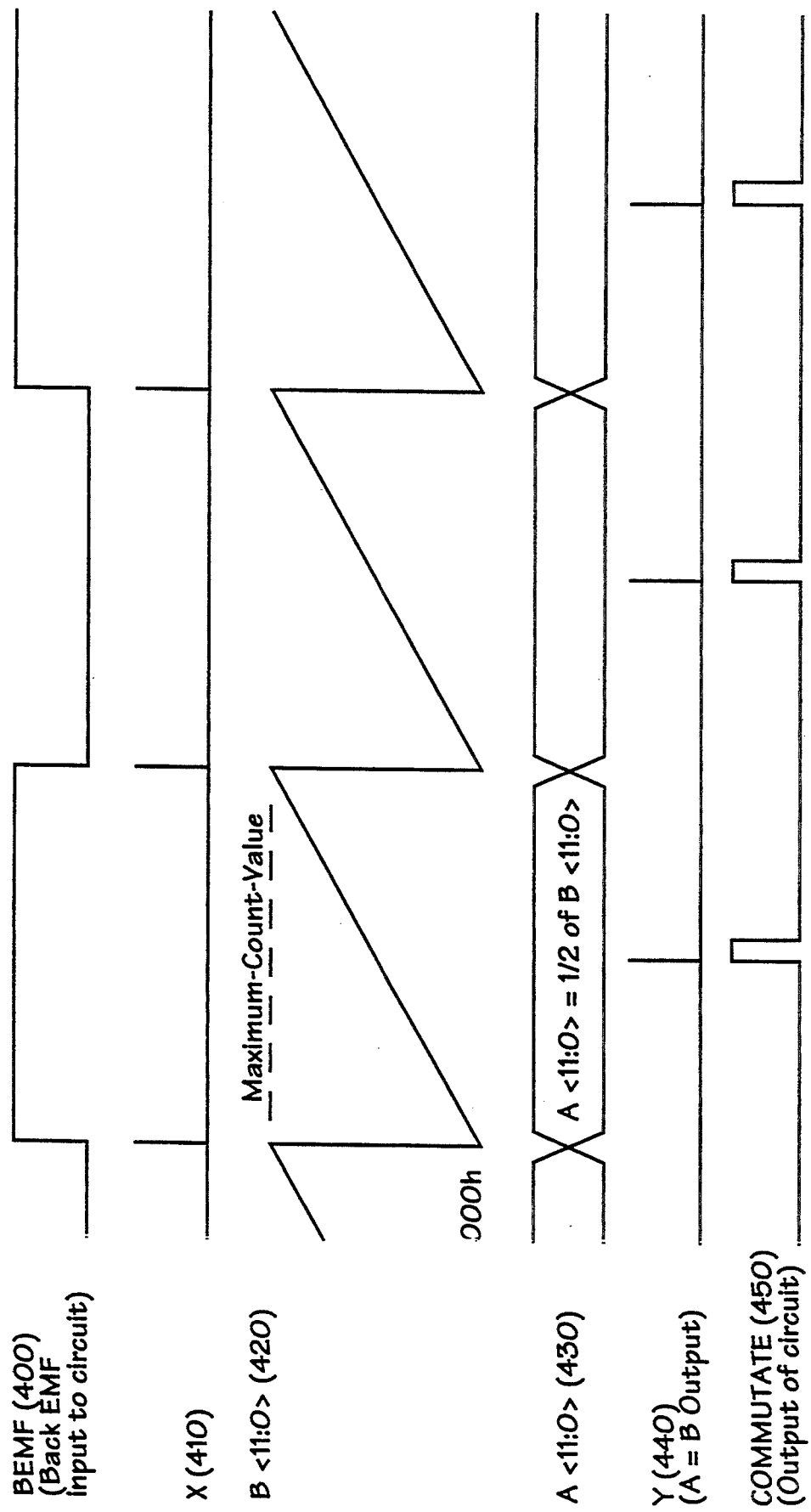

DIGITAL MOTOR COMMUNICATION CIRCUIT AND METHOD

BACKGROUND OF THE INVENTION

1. Field of the Invention

The present invention relates to the control of a spindle motor in a disk drive system. More particularly, the present invention relates to the control of the spindle motor in a disk drive system.

2. Art Background

Disk drives are popular peripherals for the storage of data. A number of different types of disk drives and media exist such as hard disk drives, floppy disk drives and optical drives. The disk containing the media on which the data is written to and read from is mounted to a spindle. The spindle and disk must be rotated at a precise, nonvarying speed in order for the head assembly, which is positioned above the surface of the disk, to read and write data on the disk surface. The spindle rotation is controlled by a spindle motor. In order to control the spindle motor, a signal, typically referred to as the commutate signal, is generated by control circuitry. Optimally the commutate signal is generated at a point and time which corresponds to a halfway point between transitions of the back EMF signal (BEMF) which transitions or toggles between a logic 1 and logic 0 state as the spindle motor spins and is therefore synchronized to the revolutions of the spindle motor such that there are multiple transitions per revolution of the spindle motor. The period between BEMF transitions is proportional to the speed of the motor and thus varies as the motor accelerates or decelerates.

The commutate signal should therefore be centered between transitions of the BEMF signal regardless of the time interval between BEMF transitions, i.e., the speed of the motor. The centering of the commutate signal is important for both power efficiency of the spindle motor and the smooth control of spindle speed.

The commutate signal is typically generated in one of two ways. In one method, an analog signal is generated using external passive components and analog circuits. This is a costly method due to the costs of providing the additional external circuit and components for each drive. In an alternate method, the disk drive controller (microprocessor) is used to generate the commutate signal. This method requires a commitment from the controller's microprocessor to perform real time processing in order to timely generate the commutate signal. As the controller provides a multiplicity of functions, real time processing to generate a commutate signal increases the processing complexity and causes either a reduction of performance in the other disk drive functions or a requirement that the controller's microprocessor be more powerful and therefore more complex and costly.

The circuit of the present invention generates the commutate signal using simple digital circuits that are easily implemented, in pre-existing real estate of a digital ASIC (Application Specific Integrated Circuit) component. Thus, one value of this invention is that it can be implemented in a digital ASIC component and provides an inexpensive solution that does not impact the performance of the disk drive.

SUMMARY OF THE INVENTION

It is an object of the present invention to provide a digital circuit and method for generating a commutate signal for controlling the spindle motor on a disk drive.

The present invention provides for the generation of a commutate signal input to control the spindle motor and therefore the rotation of the disk from which data is read to and written from. In the preferred embodiment, the design of the circuit is implemented with a relatively small number of elements to easily fit into an existing ASIC of a disk drive which is utilized to provide a variety of functions on the disk drive. Therefore, an inexpensive digital solution is implemented, which does not impact the performance of the disk drive.

The circuit includes a means for synchronizing to the back EMF (BEMF) signal generated as the BEMF signal transitions between states. A counter is provided to increment a count at every clock pulse. The counter identifies a maximum count reached at the occurrence of a transition between states of the BEMF signal. Once a BEMF signal is generated, the counter is reset and the counter once again increases a count by one at every clock pulse. The maximum count reached is divided in half and a comparator compares the divided maximum count value to subsequent count values generated by the counter. The comparator generates a pulse, referred to herein as the A=B pulse, when the count value generated by the counter and the divided maximum count value are equal. Therefore, the A=B pulse is generated halfway between BEMF signal transitions and is used to generate the commutate signal to control the spindle motor.

BRIEF DESCRIPTION OF THE DRAWINGS

The objects, features and advantages the present invention will be apparent from the following detailed description in which:

FIG. 4 is a timing diagram showing the signals generated by the circuit and method of the present invention.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the invention and, in other instances, well known electrical structures and circuits are shown in block diagram form in order not to obscure the present invention unnecessarily.

Figure 1:
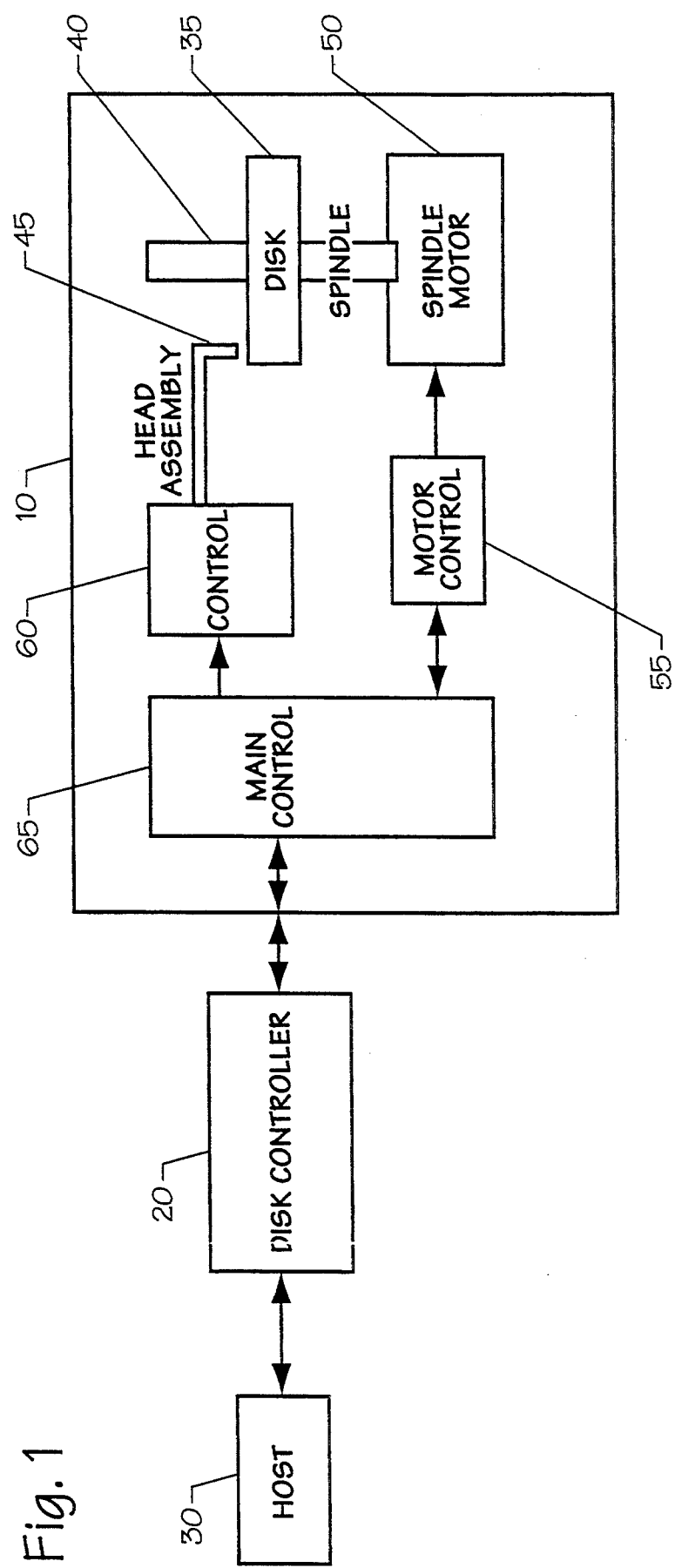
FIG. 1 is a simplified block diagram of a disk drive system implying the circuit and method of the present invention.

A simple but effective digital circuit is disclosed to generate the commutate signal needed to control the spindle motor and therefore the rotation of the spindle and disk assembly. A block diagram of the system is shown at FIG. 1. A disk drive 10 is typically coupled to a disk controller 20 which controls the operation of the disk drive 10 and communicates information to and from the host system which accesses the disk drive 10 as a peripheral device. The disk drive 10 includes a number of elements, such as the disk media itself 35 which is mounted on a spindle 40. The spindle provides the means for the disk media 35 to rotate, thereby enabling the head assembly 45 to read and write data off of the disk 35. The rotation of the spindle 40 is achieved via a spindle motor 50 which is controlled by a motor control circuit 55. The reading and writing of the data is similarly controlled by a control means 60. A main or central control mechanism 65 interfaces to the disk controller 20, which issues specific commands or operations to the disk drive and controls the operation of the disk drive components. Furthermore, central control 65 controls the communication of data to and from the disk drive.

The commutate signal is one signal generated to control the spindle motor 50. The signal must be generated half-way between BEMF transitions. As the durations between BEMF transitions can vary, it is important that the timing of the generation of the commutate signal correspondingly varies.

Figure 2:
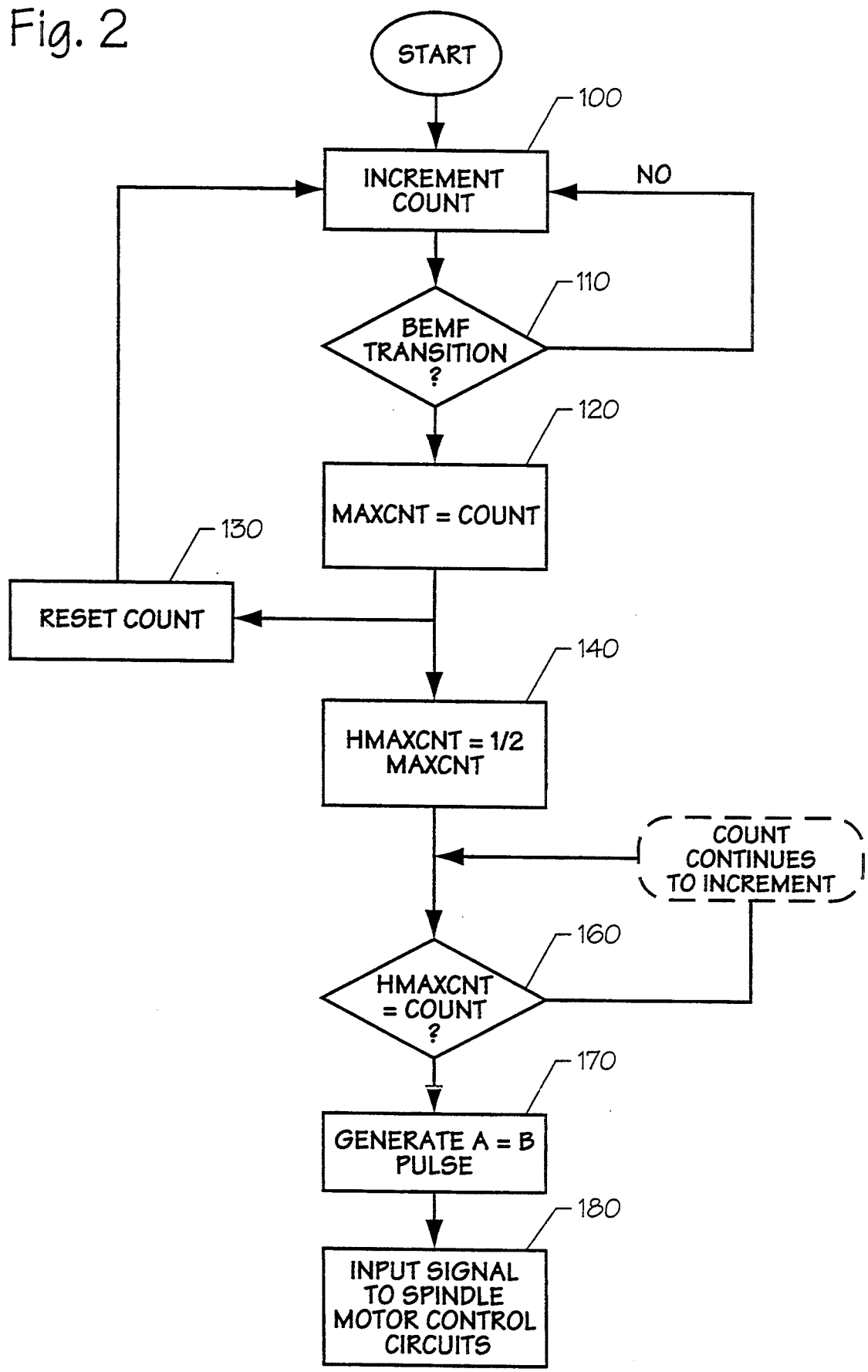
FIG. 2 is a flow diagram of the method of the present invention.

The process is explained with reference to FIG. 2. A count is initiated, step 100, by which the count is incremented at each clock pulse of the clock signal of the circuit. The spindle motor generates a back EMF signal (BEMF). This signal transitions periodically between a logic 1 and a logic 0 state as the motor spins and is synchronized to the revolutions of the spindle motor. The period of BEMF transitions is proportional to the speed of the motor and thus varies as the motor accelerates and decelerates.

The count continues to increment at each clock until a BEMF transition is detected, step 110. When a BEMF transition is detected, the count at that time is identified to be the maximum count value, step 120, and the count is then reset, to an initial value, such as zero, step 130, such that the incremental counting process begins once again at step 100.

At step 140, the maximum count is divided in half. Preferably, this step is performed by shifting to the right by one bit the binary representation of the maximum count value. As the newly restarted count is incremented, it is compared to the divided maximum count value 160. If the divided maximum count value equals the current count, a pulse, referred to herein as the A=B pulse, is generated, step 170. The A=B pulse occurs at the midway point between BEMF transitions and is used to generate a commutate signal for input to the spindle motor control circuits. The location of the A=B pulse will vary as the time between BEMF transistions vary thereby ensuring that the A=B pulse is consistently centered between BEMF transitions. As noted earlier, the centering of the commutate signal between BEMF transitions is important for both power efficiency of the spindle motor and smooth control of the spindle speed.

Figure 3:
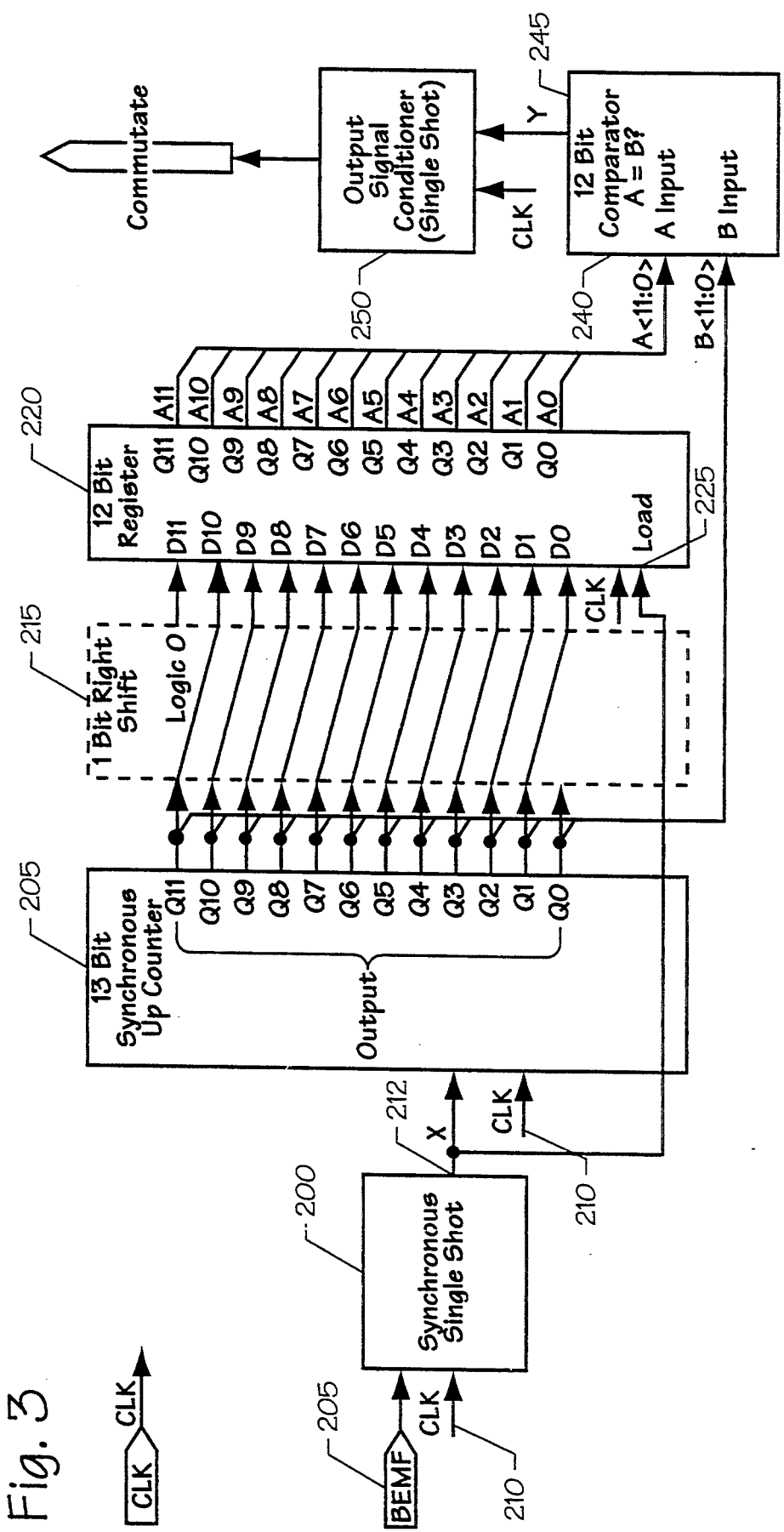
FIG. 3 is a simplified block diagram of a circuit for generating a commutate signal in accordance with the teachings of the present invention.

An exemplary circuit block diagram is shown in FIG. 3. It is readily apparent that other components may be used to perform the process described herein. In the present embodiment it is preferred that the circuit is implemented using simple elements that are easily implemented on an ASIC. More particularly, the circuit is implemented in the disk on an ASIC drive which is designed to provide other drive functions. Thus, the incremental cost is minimal and the need for external circuitry is eliminated. As most ASICs tend to be pad limited, that is, the functionality of the ASIC is limited by the number of I/O pins on the ASIC, there is room to add the gates necessary in the ASIC core to implement the commutate signal generator circuit described herein.

Referring to FIG. 3, a synchronous single shot component 200 receives as input the BEMF signal 205 and the clock input signal 210. A pulse, preferably of a width corresponding to a clock cycle, is generated at the detection of each BEMF signal as output 212. This "X" signal is input to a synchronous counter 205, which incrementally counts up to a maximum counter value. The counter 205 increments at each clock cycle input in accordance with the clock input 210.

Preferably, the size of the counter 205, i.e., the number of bits, is selected such that the maximum counter value that the counter 205 can reach is greater than the foreseeable maximum count value reached by counting between BEMF pulses. For example, size of the counter should be selected such that the maximum counter value is approximately twice that of the projected maximum counts reached between BEMF transistions. This ensures that the varying speeds, and therefore varying time periods between BEMF transitions, do not cause the counter to exceed the maximum counter value it is capable of counting to, thereby providing a misleading maximum count value. However, it is also preferred that if for some reason the counter exceeds the maximum counter value, the counter does not restart the count at the initial value until a reset signal is received in accordance with a BEMF transition. The maximum counter value will be used as the maximum count value in those circumstances.

The maximum count value is input to a dividing means 215 which, in the present embodiment, is simply a hard wired one bit-shift, which functions to shift the count to the right to divide the count value in half. Therefore, the output of the counter is shifted right one bit, and transferred immediately to the input pins of a 12-bit register 220. The register 220 loads the divided maximum count value at the occurrence of the pulse output from the synchronous single shot 200, which is input to the load input 225 of the register 220, thereby only loading the divided maximum count value into the register 220. The components 200, 205, 215, 220 therefore function together to load a value equal to one-half of the maximum count value reached between transitions of BEMF signals. At each BEMF transition, therefore, a value equal to one-half the maximum count value reached prior to receipt of the transition pulse triggered by the BEMF transition is loaded into the register 220 and the counter 205 is reset to an initial value, preferably zero, such that the counter can again begin counting from the initial value.

At each clock thereafter, the value stored in the register 220 is output to a comparator 240, which also receives as input the current count value output 212 by the synchronous up counter 205. When the two inputs are of equal value, that is, when the current count value equals one half the maximum count value between BEMF transitions, a signal, referred to herein as the A=B pulse, is generated at the output 245. The timing of the puse corresponds to the timing of the desired commutate signal. This pulse can be output as the commutate signal. Preferably, the A=B pulse is input to an output signal conditioner 250, which generates a commutate signal pulse of a width compatible with existing spindle motor control circuitry, such as a square wve pulse, one clock cycle in width. The circuit therefore provides a simple, but effective, mechanism, easily implemented on an existing disk drive ASIC, to generate the commutate signal to ensure proper control of the spindle motor.

The circuit and process can further be understood by the timing diagrams shown in FIG. 4. The BEMF signal 400 transitions between a high and a low state periodically. The X signal 410 represents the pulse output (212, FIG. 3) from the synchronous single shot component (200, FIG. 3) which occurs at the transition of the BEMF signal 400. The count signal 420 graphically represents the increasing counter output from an initial zero value at the occurrence of the BEMF signal transition and the generation of the synchronous pulse at the X signal output 410. The count is reset from the maximum count value to zero at the next BEMF transition.

The next signal 430 represents the value loaded into the register (220, FIG. 3) which is equal to one-half of the maximum count value achieved by the counter. A new value is loaded at the occurrence of the hard wired pulse at the X signal 410 corresponding to a BEMF transition. The Y signal, also referred to as the A=B pulse, 440 is generated at the output of the comparator (240, FIG. 3) when the count equals the value stored by the 12-bit register (220, FIG. 3) corresponding to one-half of the maximum count value. This will therefore occur halfway between zero and the maximum count value generated by the counter. A commutate signal 450 is then generated from the A=B pulse 440.

The invention has been described in conjunction with the preferred embodiment. It is evident that numerous alternatives, modifications, variations and uses will be apparent to the one skilled in the art in light of the foregoing description.

What is claimed is:

1. In a disk drive system comprising a disk which revolves around a spindle driven by a spindle motor, an apparatus for controlling the spindle motor comprising:

a synchronizing means which receives as input a back EMF (BEMF) signal, said BEMF signal generated by the spindle motor and transitioning between a first and second state, said synchronizing means generating a synchronizing pulse, said synchronizing pulse generated for each transition of the BEMF signal;

an N bit counter means coupled to receive the synchronizing pulse generated by the synchronizing means and a clock input signal, said counter incrementing a count at each clock, said counter resetting from a maximum count value reached to an initial value when a synchronizing pulse is received;

a dividing means coupled to receive a count value from the counter, said divider means dividing the count value by one/half;

a register means coupled to receive a divided count value from the dividing means, the clock signal input and the synchronizing pulse, said synchronizing pulse triggering the loading of a divided maximum count value received from the dividing means into the register means;

a comparator means coupled to the register means and the counter for comparing each count value output by the counter to the divided maximum count value, said comparator generating an A=B pulse when the count value and the divided maximum count value are equal, wherein said A=B pulse is generated midway between BEMF pulse transitions and is used to control the spindle motor.

2. The apparatus as set forth in claim 1, further comprising an output signal conditioner coupled to receive the A=B pulse for generating a pulse of a pulse width to be input to control the spindle motor.

3. The apparatus as set forth in claim 1, wherein said synchronizing means further receives a clock input signal and the synchronizing pulse is of a width equal to a cycle of the clock input signal.

4. The apparatus as set forth in claim 1, wherein N is determined according to the maximum time interval between BEMF transitions and the clock frequency.

5. The apparatus as set forth in claim 4, wherein N is equal to 12.

6. The apparatus as set forth in claim 1, wherein said dividing means comprising a right shift means which shifts the count one bit to the right to divide the count in half.

7. The apparatus as set forth in claim 6, wherein the right shift means comprises wires which couple each bit output by the counter means is a corresponding bit input of the register means shifted to the right by one bit location.

8. The apparatus as set forth in claim 1, wherein the A=B pulse is of a width equal to a cycle of the clock input signal.

9. The apparatus as set forth in claim 1, wherein the apparatus is constructed on an ASIC.

10. In a disk drive system comprising a disk which revolves around a spindle driven by a spindle motor, an apparatus for controlling the spindle motor comprising:

a synchronizer which receives as input a back EMF (BEMF) signal, said BEMF signal generated by the spindle motor and transitioning between a first and second state, said synchronizer generating a synchronizing pulse for each transition of the BEMF signal;

an N bit counter coupled to receive the synchronizing pulse generated by the synchronizer and a clock input signal, said counter incrementing a count at each clock, said counter reaching a maximum count value when the synchronizing pulse is received, said counter further resetting to an initial value when the synchronizing pulse is received;

a register coupled to receive a count value, the clock signal input and the synchronizing pulse, said register loading a count value upon receipt of a synchronizing pulse;

a hard-wired coupling between the output of the counter and an input of the register, said hard-wired coupling shifting the count value output by the counter one bit to the right to divide the count value in half, prior to the input to the register, such that the register loads a value corresponding to one-half the maximum count value;

a comparator coupled to the register and the counter for comparing a count to the shifted maximum count value, said comparator generating an A=B pulse when the count value and one-half the maximum count value are equal, wherein said spindle pulse is generated midway between BEMF pulse transitions and is used to control the spindle motor.

11. The apparatus as set forth in claim 10, further comprising an output signal conditioner coupled to receive the A=B pulse for generating a pulse of a predetermined width to be input to control the spindle motor.

12. The apparatus as set forth in claim 10, wherein said synchronizing means further receives a clock input signal and the synchronizing pulse is of a width equal to a cycle of the clock input signal.

13. The apparatus as set forth in claim 10, wherein N is determined according to the maximum time interval between BEMF transitions and the clock frequency.

14. The apparatus as set forth in claim 13, wherein N is equal to 12.

15. The apparatus as set forth in claim 10, wherein the A=B pulse is of a width equal to a cycle of the clock input signal.

16. The apparatus as set forth in claim 10, wherein the apparatus is constructed on an ASIC.

17. In a disk drive system comprising a disk which revolves around a spindle driven by a spindle motor, an method for controlling the spindle motor comprising:
  incrementing a count at each clock signal;
  generating a synchronizing pulse for each transition of a back EMF (BEMF) signal, said BEMF signal generated by the spindle motor transitioning between a first and second state;
  identifying a maximum count value when a synchronizing pulse is received;
  resetting the count to an initial value when the synchronizing pulse is received such that the count value is again incremented from an initial value at each clock signal;
  dividing the maximum count value by one-half;
  comparing the count value to the divided maximum count value; and
  generating an A=B pulse when the count and the divided maximum count value are equal, wherein said A=B pulse is generated midway between BEMF pulse transitions and is used to control the spindle motor.

18. The method as set forth in claim 17, further comprising the step of generating an output pulse from the A=B pulse of a predetermined pulse width for input to control the spindle motor.

19. The method as set forth in claim 17, wherein said step of generating a synchronizing pulse further comprises the steps of generating a synchronizing pulse of a width equal to a cycle of the clock input signal.

20. The method as set forth in claim 17, wherein the step of dividing the maximum count comprises the step of right shifting a binary representation of the maximum count value by one bit.

21. The method as set forth in claim 17, wherein the step of generating an output pulse comprises the step of generating a pulse of a width equal to one clock cycle.

* * * * *